United States Patent [19]

Hill

[11] 4,257,617
[45] Mar. 24, 1981

[54] SHAFT SEAL ASSEMBLY

[75] Inventor: M. Raymond Hill, Irwin, Pa.

[73] Assignee: Carrier Corporation, Syracuse, N.Y.

[21] Appl. No.: 958,295

[22] Filed: Nov. 6, 1978

[51] Int. Cl.³ ............................................. F16J 15/40
[52] U.S. Cl. ........................................ 277/3; 277/27; 277/53
[58] Field of Search ..................... 277/3, 27, 193, 195, 277/197, 53

[56] References Cited

U.S. PATENT DOCUMENTS

| 3,026,112 | 3/1962 | Mayer | 277/3 |
| 3,815,926 | 6/1974 | Vore | 277/34 |
| 4,114,058 | 9/1978 | Albaric | 277/3 |

Primary Examiner—Robert I. Smith
Attorney, Agent, or Firm—J. Raymond Curtin; David J. Zobkiw

[57] ABSTRACT

A shaft seal assembly comprises contact seal rings which are inserted into a recess formed within labyrinth seal rings encompassing the shaft. The contact seal rings are adapted to be in sealing engagement with the shaft when the shaft is not rotating or the shaft speed is relatively slow. The contact seal rings are moved radially outward with respect to the rotary shaft when the shaft speed is increased. Buffer liquid generates the force to move the contact seal rings radially outward from sealing engagement with the shaft and at the same time establishes a barrier for process fluid when the shaft speed is increased.

8 Claims, 2 Drawing Figures

SHAFT SEAL ASSEMBLY

BACKGROUND OF THE INVENTION

This invention relates to sealing means employed in a rotary machine, such as a turbine or compressor, and in particular to seals used to prevent a process gas from escaping about the shaft of the rotary machine.

In order to accommodate a rotating shaft extending through a wall, as for example in a compressor or turbine, it is necessary to provide clearance between the shaft and the wall. The process gas, or high pressure gas, on one side of the wall tends to flow along the shaft of the rotary machine through the clearance to the atmosphere or other low pressure region on the other side of the wall. Therefore the shaft of the rotary machine must be equipped with sealing means for preventing gas flow or leakage through this clearance between the shaft and the wall. Likewise, specific applications often require that the process gas which contacts one part of the rotary shaft be prevented from coming in contact with or intermixing with fluids at another portion of the shaft.

Labyrinth and carbon ring type seals are commonly interposed between the atmosphere and the process gas area to restrict gas leakage to a minimum. Carbon ring type seals are normally effective in applications where the shaft speeds are relatively slow. In high speeds and high pressure applications the labyrinth type seal is more practical since there is no contact between the seal and the shaft. Very often it is desirable to completely isolate the process gas in the compressor when labyrinth type or carbon type seals are used. Accordingly, a small amount of buffer fluid may be injected between the process fluid and the seal to establish a buffer or barrier. The buffer fluid is generally injected into a region at a pressure slightly above the pressure of the process fluid. From the injection point, the high pressure buffer fluid generally flows in opposite directions along the shaft, respectively toward a low pressure region or atmosphere and toward the working or process gas region of the compressor. Since very low differential pressures are involved, between the process fluid and buffer fluid, the consumption of the buffer fluid is small. The process fluid is prevented or restricted from escaping to the atmosphere by the labyrinth seal, which provides an effective seal at high pressure conditions.

A labyrinth seal is less effective at low pressure differentials, such as occur when the shaft is not rotating or is rotating at relatively low speeds. Under these conditions a carbon ring seal is more desirable. Labyrinth seals become effective at high speed and pressure differentials. However, carbon seals are less desirable at high speeds since they contact the shaft and are subjected to excessive wear.

In applications where both high speed and low speed and high pressures and low pressures are encountered such as lubrication oil cavities of turbochargers, it is necessary to be able to effectively seal at both sets of conditions. The combination of a labyrinth type seal and a carbon ring seal permits effective use of a single seal system in machines that have varying shaft speeds and operating pressures.

Prior art devices use a combination of two sealing devices to restrict the flow of gas along the shaft. The first seal in the sealing device is preferably of the labyrinth type and is mounted encompass the shaft. The second seal may be a carbon or graphite ring seal which operates when the shaft is at rest to restrict the gas flow along the shaft. When the shaft is rotated the carbon ring seal is moved axially by a centrifugal mechanism to a position where it is ineffective in sealing the operting gas. In this type of application a complicated centrifugally operable device is required to move the carbon seal out of sealing engagement with the shaft. No such device is required in the invention disclosed herein. Normally available buffer gas is utilized to move the carbon seals without requiring the use of additional moving parts.

SUMMARY OF THE INVENTION

It is therefore an object of the present invention to provide a seal assembly for sealing against escape of process fluid around a rotary shaft.

It is a further object of this invention to provide a shaft seal which regulates the flow of the process fluid as a function of shaft speeds.

It is also an object of this invention to provide an improved sealing structure which changes its configuration in accordance with changes in shaft speed.

A further object of this invention is to provide a relatively simple and inexpensive seal arrangement for use in a turbomachine.

It is also an object of this invention to increase the effective operational life of contact type seals.

These and other objects of the present invention are attained by means of a sealing assembly having a first seal of the labyrinth type and a second seal of the contact carbon type inserted into a recess formed within the first seal and arranged to be moved radially outward with respect to the shaft when the shaft speed is increased by means of a force proportional to the pressure of the buffer fluid. The pressure of the buffer fluid is proportional to the speed of the shaft.

DESCRIPTION OF THE PREFERRED EMBODIMENT

Figure 1:
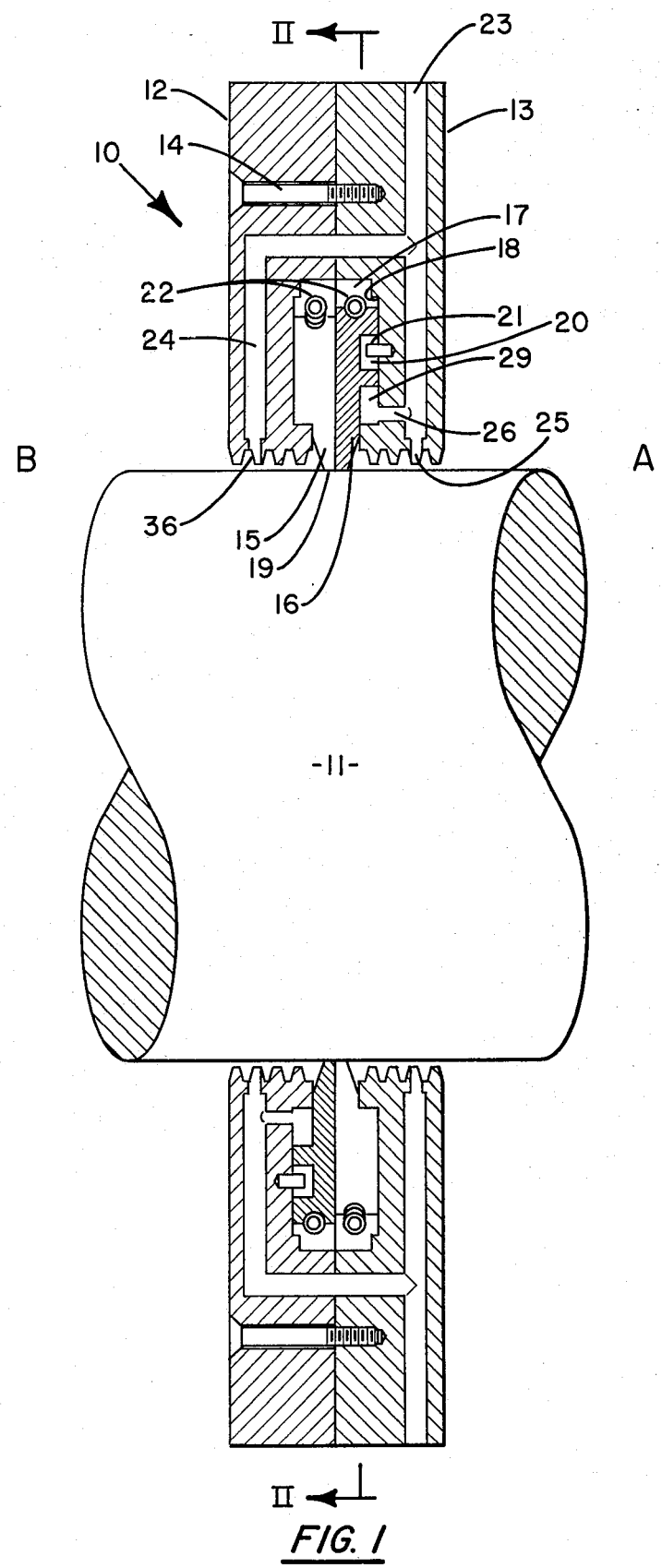
FIG. 1 is a cross-sectional view taken on line I—I of FIG. 2, illustrating a sealing assembly encompassing the teachings of the present invention.

Referring now to FIG. 1, there is illustrated a sealing assembly employed in a turbomachine and arranged to prevent the process or working fluid, such as a gas contained in the relatively high pressure region B, as for example, the discharge side of a compressor, from escaping to an area A of relatively lower pressure, as for example the ambient.

It should be understood that the turbomachine can take any form such as a turbine or a compressor of the type having its rotary components on a shaft 11. A sealing assembly 10 embodying the teachings of the present invention is mounted around the shaft to prevent leakage of the process or working fluid from area B to area A. Sealing assembly 10 includes labyrinth type seal comprising, as for example, two labyrinth seal rings 12 and 13 secured by means of suitable devices, such as screws 14. A contact type seal is mounted about shaft 11 and may include two contact seal rings 15 and 16. Seal rings 15 and 16 are carried within a recess 17 defined by inner sides 18 of labyrinth seal rings 12 and 13. Contact seal rings 15, 16 are preferably formed of carbon or like material and are mounted about shaft 11. A series of circumferentially spaced slots 20 are formed in contact seal rings 15, 16. Guide pins 21 secured in labyrinth seal rings 12, 13 are positioned respectively in the slots 20 to permit the slidable movement of contact rings 15, 16 relative to guide pins 21. Compression springs 22 circumferentially engage seal rings 15, 16 to force the seal rings radially inward into contact with shaft 11. Labyrinth rings 12, 13 include channels or conduits 23, 24 to deliver a buffer fluid radially inward towards shaft 11 from a source thereof (not shown). The ends of channels 23, 24 may be provided with nozzles 25 to regulate the amount of the buffer fluid injected into the sealing regions 36 of shaft 11. Ports 26 are arranged in labyrinth seal rings 12, 13 to deliver the buffer gas flowing through channels 23, 24 to recesses 29 formed in contact seal rings 15, 16. The pressure of the buffer fluid in recesses 29 generates a radial force acting outwardly relative to shaft 11 against rings 15, 16 to move the rings outwardly relative to the shaft when the force generated by the buffer gas exceeds the force of springs 22.

Figure 2:
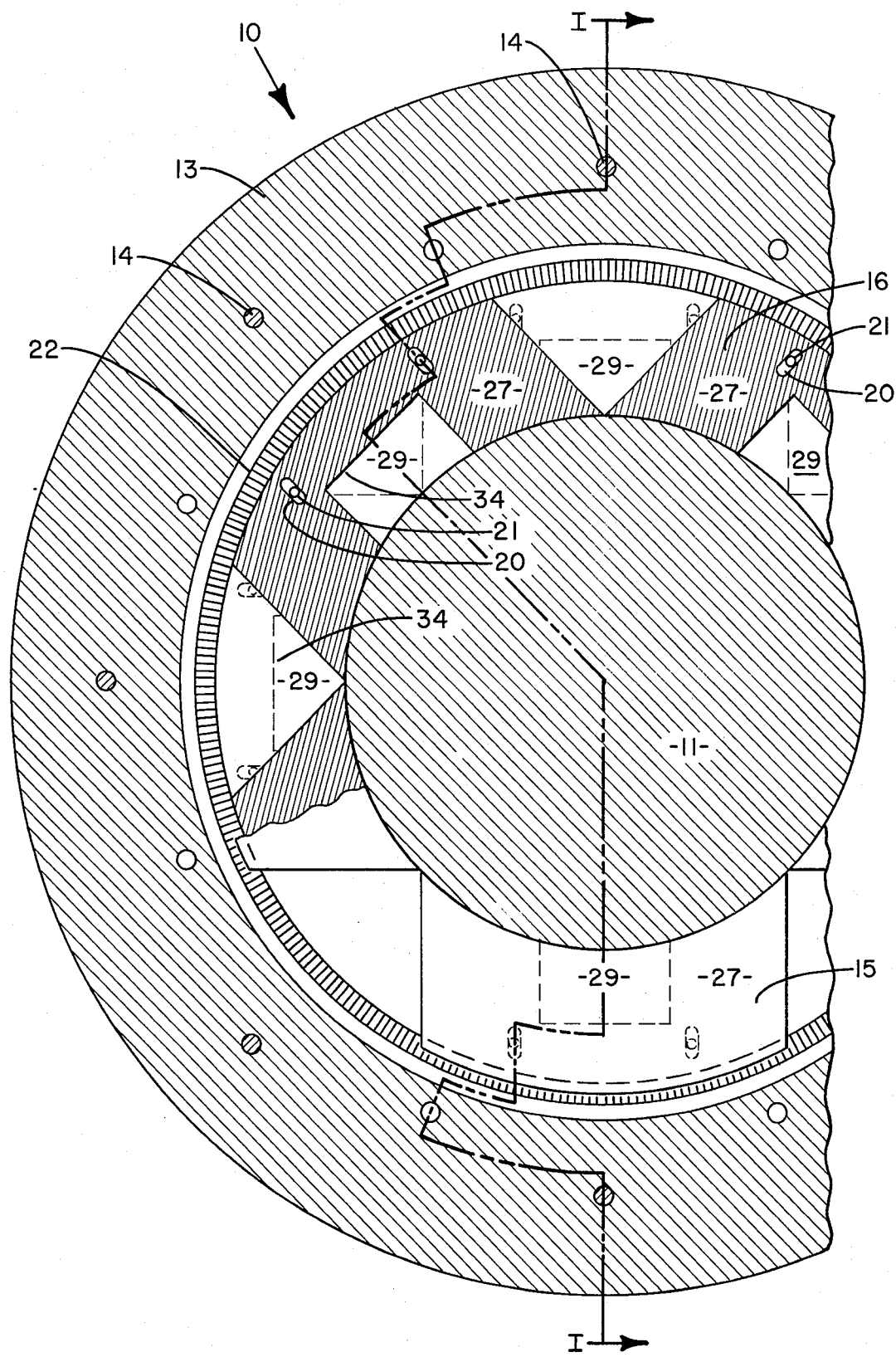
FIG. 2 is a cross-sectional view taken on line II—II of FIG. 1, illustrating the respective positions of the contact seal elements on the shaft.

As best seen in FIG. 2 each contact seal ring may include, as for example, four segments 27, each segment having a recess 29 extending outwardly from the center line of the ring. Adjacent seal rings 15 and 16 are circumferentially displaced relative to each other so the vertical axis of each segment 27 of the rear seal ring 15 is positioned between the vertical axes of two adjacent segments of the front seal ring 16 to provide a reliable seal encompassing the entire surface of shaft 11.

In operation, the buffer fluid is delivered from a source thereof, such as the discharge of the compressor, and injected through channels 23 and 24, into the sealing regions 36. The magnitude of the pressure of the buffer fluid is higher than the magnitude of the pressure of the process fluid, preventing flow of working fluid from area B to area A. The flow of working fluid is restricted through well known principles of operation of labyrinth seal rings 12 and 13. Under conditions, when shaft 11 is not rotating or is rotating at relatively slow speed, the buffer fluid pressure is relatively low. The pressure of the buffer fluid delivered from the discharge of the compressor is proportional to the rotational speed of shaft 11. Under such conditions, the pressure of the buffer fluid injected into channels 23 and 24, ports 26 and recesses 29, is not sufficient to overcome the forces generated by springs 22. Rings 15, 16 are thus maintained in contact with shaft 11 to augment the sealing provided by labyrinth seal rings 12, 13. The contact seal rings 15 and 16 thus assist in preventing process fluid from escaping from area B to area A during periods of shutdown or slow speed operation.

As shaft speed is increased, the pressure of the buffer fluid flowing from the injection region at the channels 23 and 24 to the sealing region 36 will correspondingly increase. Buffer fluid at relatively high pressure passes through the ports 26 and flows into recesses 29. The pressure of the buffer fluid flow to recesses 29 is sufficient to develop a radial force acting on the upper surfaces 34 of the recesses 29 and being of a magnitude that is sufficient to overcome the forces generated by springs 22 to move the segments 27 of each ring 15, 16 outwardly with respect to shaft 11. Contact seal rings 15 and 16 thus do not contact the surface of shaft 11 at high shaft speeds. The buffer fluid, at a pressure higher than the process fluid pressure, flows through channels 23, 24 and nozzles 25 to sealing regions 36 and operates together with labyrinth seal rings 12, 13 to establish a barrier to the flow of process fluid from area B to area A.

The structure of the present invention provides a simple, inexpensive and effective seal system for a rotary machine.

While a specific embodiment of the invention has been shown and described in detail to illustrate the application of the principles of the invention, it will be understood that the invention may be otherwise embodied within the scope of the following claims without departing from such principles.

What is claimed is:

1. A shaft seal assembly for a rotary machine, wherein a process fluid contained within a relatively high pressure region of the rotary machine is prevented from escaping to surrounding regions of relatively lower pressure, comprising:

first seal means encompassing the rotary shaft in a spaced relationship to provide a first fluid flow restriction along the shaft, second seal means including a plurality of circumferentially extending segments also encompassing said shaft for providing a further flow restriction along the shaft and including means for generating a first force of a predetermined magnitude for maintaining the segments of said second seal means in contact sealing engagement with said shaft and means responsive to fluid pressure for opposing said means for generating a first force to move the segments of said second seal means out of contact sealing engagement with said shaft, and conduit means for delivering a fluid to said first and second seal means and including a first fluid path means for delivering fluid to said first seal means wherein fluid is discharged into said first fluid flow restriction to act as a buffer fluid to prevent said process fluid from passing from the high pressure region to the surrounding region and second fluid path means for delivering a portion of said delivered fluid to said means responsive to fluid pressure whereby as the pressure of said delivered fluid is increased said first seal means becomes more effective and the segments of said second seal means are moved out of contact sealing engagement.

2. A shaft seal assembly according to claim 1 wherein said means for generating a first force include compression spring means contacting said second seal means to urge same said seal means radially inwardly into sealing engagement with said shaft for preventing the process fluid from escaping to said low pressure region.

3. A shaft seal assembly according to claim 1, wherein said first seal means is formed of a pair of adjacent seal rings, each having an inner recess, and said second seal means is also formed of a pair of adjacent segmented seal rings inserted into said inner recesses of the seal rings of said first seal means.

4. A shaft seal assembly according to claim 3 wherein each segment of said seal means has an internal recess extending outwardly radially from the shaft which defines said means responsive to fluid pressure.

5. A shaft seal assembly according to claim 4 wherein adjacent seal rings of the second seal means are circumferentially displaced relative to each other to provide a tight seal encircling the shaft for preventing the process fluid from passing from the high pressure region to the low pressure region.

6. A shaft seal assembly according to claim 5 wherein each seal ring of the first seal means includes a plurality of circumferentially spaced guide pins and each segment of the second seal means includes a plurality of suitable circumferentially spaced slots, said guide pins are positioned in said slots to permit said segments of the second seal means to slide relative to said guide pins when the second seal means is moved radially outward with respect to the shaft.

7. A shaft seal assembly for a rotary machine, wherein a process fluid contained within a relatively high pressure region of the rotary machine is prevented from escaping to surrounding areas of relatively lower pressure comprising:

a first sealing member encircling the shaft to provide a fluid flow restriction along the shaft and including a pair of adjacent seal rings, each ring having an inner recess extending outwardly from the shaft, a second sealing member also encircling the shaft to provide a further fluid flow restriction, including a pair of adjacent seal rings, each ring being inserted into said inner recesses of the seal rings of the first sealing member, and compression springs mounted around said seal rings of said second sealing member for generating a first force to urge the seal rings of said second sealing member against the shaft to provide a sealing engagement with the shaft, said seal rings of the second sealing member being formed of a series of segments, each segment of said seal ring of the second sealing member having an internal recess extending radially outwardly from the inner surface of the segment, said seal rings of said second sealing member being circumferentially displaced relative to each other to provide a tight seal encompassing the entire surface of the shaft, guide pins circumferentially disposed within each seal ring of the first sealing member and secured therein, a slot formed on a face of each of said segments, said guide pins being arranged within said slots to permit a slidable movement of said segments relative to said guide pins in a radial direction, fluid feed conduits disposed within said seal rings of the first sealing member to deliver a buffer fluid to a sealing fluid region, ports disposed within said seal rings of the first sealing member and connecting said fluid feed conduits with said internal recesses of said segments for delivering a portion of the buffer fluid to said segments to develop a second force acting therein in opposition to said first force, whereby when the magnitude of the second force exceeds the magnitude of the first force the segments of the seal rings of the second sealing member are moved radially outward in spaced relation to said shaft.

8. A method of sealing a rotary machine shaft for preventing a process fluid contained within a high pressure region of the rotary machine form escaping to surrounding areas of relatively lower pressure, comprising:

restricting a fluid flow along the shaft through a first seal, further restricting a fluid flow along the shaft through a second seal, generating a first force of a predetermined magnitude for maintaining the second seal in contact sealing engagement with said shaft, delivering a buffer fluid to a sealing fluid region to establish a further seal preventing the process fluid from passing from the high pressure region to the low pressure region, utilizing a portion of the buffer fluid to develop a second force acting on the second seal in opposition to said first force and having a magnitude varying proportionally to the rotational speed of the shaft, and moving the second seal radially outward in spaced relation to said shaft when the magnitude of the second force exceeds the magnitude of the first force.

* * * * *